(12) United States Patent
DeStefano et al.

(10) Patent No.: US 8,903,836 B2
(45) Date of Patent: Dec. 2, 2014

(54) SYSTEM AND METHOD FOR PARSING, SUMMARIZING AND REPORTING LOG DATA

(75) Inventors: Jason Michael DeStefano, Sunnyvale, CA (US); Thomas Hunt Schabo Grabowski, Minneapolis, MN (US)

(73) Assignee: TIBCO Software Inc., Palo Alto, CA (US)

( * ) Notice: Subject to any disclaimer, the term of this patent is extended or adjusted under 35 U.S.C. 154(b) by 0 days.

(21) Appl. No.: 13/562,047

(22) Filed: Jul. 30, 2012

(65) Prior Publication Data

US 2013/0138667 A1 May 30, 2013

Related U.S. Application Data

(63) Continuation of application No. 10/992,230, filed on Nov. 18, 2004, now Pat. No. 8,234,256.

(60) Provisional application No. 60/525,465, filed on Nov. 26, 2003, provisional application No. 60/525,401, filed on Nov. 26, 2003.

(51) Int. Cl.
  *G06F 17/30* (2006.01)
  *G06F 11/30* (2006.01)
  *G06F 17/27* (2006.01)
  *H04L 29/06* (2006.01)

(52) U.S. Cl.
  CPC ........ *G06F 17/2705* (2013.01); *G06F 11/3006* (2013.01); *G06F 11/3082* (2013.01); *Y10S 707/99933* (2013.01); *H04L 63/1425* (2013.01)
  USPC ........... 707/755; 707/689; 707/672; 707/662; 726/11; 726/14; 707/999.003

(58) Field of Classification Search
  USPC ........ 707/755, 740, 706, 648, 689, 672, 662; 714/20; 726/4, 11, 14
  See application file for complete search history.

(56) References Cited

U.S. PATENT DOCUMENTS

| | | | |
|---|---|---|---|
| 5,606,693 A * | 2/1997 | Nilsen et al. | 1/1 |
| 5,627,886 A | 5/1997 | Bowman | |
| 5,668,986 A * | 9/1997 | Nilsen et al. | 1/1 |
| 5,787,253 A | 7/1998 | McCreery et al. | |
| 5,832,508 A * | 11/1998 | Sherman et al. | 1/1 |
| 5,832,517 A * | 11/1998 | Knutsen, II | 1/1 |
| 5,886,643 A | 3/1999 | Diebboll et al. | |
| 5,903,898 A * | 5/1999 | Cohen et al. | 707/648 |

(Continued)

OTHER PUBLICATIONS

Sukran Asarcikli, "Firewall monitoring using intrusion detection system", Oct. 2005.

(Continued)

*Primary Examiner* — Jean M Corrielus
(74) *Attorney, Agent, or Firm* — Fish & Richardson P.C.

(57) ABSTRACT

A system and method is disclosed which enables network administrators and the like to quickly analyze the data produced by log-producing devices such as network firewalls and routers. Unlike systems of the prior art, the system disclosed herein automatically parses and summarizes log data before inserting it into one or more databases. This greatly reduces the volume of data stored in the database and permits database queries to be run and reports generated while many types of attempted breaches of network security are still in progress. Database maintenance may also be accomplished automatically by the system to delete or archive old log data.

21 Claims, 9 Drawing Sheets

(56) References Cited

U.S. PATENT DOCUMENTS

| | | | |
|---|---|---|---|
| 6,052,694 A * | 4/2000 | Bromberg | 1/1 |
| 6,134,591 A | 10/2000 | Nickles | |
| 6,289,455 B1 | 9/2001 | Kocher et al. | |
| 6,321,234 B1 * | 11/2001 | Debrunner | 1/1 |
| 6,381,628 B1 | 4/2002 | Hunt | |
| 6,484,203 B1 | 11/2002 | Porras et al. | |
| 6,496,858 B1 | 12/2002 | Frailong et al. | |
| 6,530,024 B1 | 3/2003 | Proctor | |
| 6,618,822 B1 * | 9/2003 | Loaiza et al. | 714/20 |
| 6,640,305 B2 | 10/2003 | Kocher et al. | |
| 6,714,977 B1 | 3/2004 | Fowler et al. | |
| 6,754,214 B1 | 6/2004 | Mahalingaiah | |
| 6,836,894 B1 | 12/2004 | Hellerstein et al. | |
| 6,873,981 B2 | 3/2005 | Nareddy et al. | |
| 6,917,972 B1 | 7/2005 | Basko et al. | |
| 7,031,981 B1 | 4/2006 | DeLuca et al. | |
| 7,039,816 B2 | 5/2006 | Kocher et al. | |
| 7,043,505 B1 | 5/2006 | Teague et al. | |
| 7,099,884 B2 | 8/2006 | Gu | |
| 7,103,772 B2 | 9/2006 | Jorgensen et al. | |
| 7,155,460 B2 | 12/2006 | McGovern et al. | |
| 7,181,766 B2 | 2/2007 | Bendinelli et al. | |
| 7,219,239 B1 | 5/2007 | Njemanze et al. | |
| 7,231,403 B1 | 6/2007 | Howitt et al. | |
| 7,246,156 B2 | 7/2007 | Ginter et al. | |
| 7,599,939 B2 | 10/2009 | DeStefano et al. | |
| 8,234,256 B2 | 7/2012 | DeStefano et al. | |
| 2002/0046273 A1 * | 4/2002 | Lahr et al. | 709/224 |
| 2002/0062237 A1 | 5/2002 | Matsumoto et al. | |
| 2002/0138762 A1 | 9/2002 | Horne | |
| 2003/0037136 A1 | 2/2003 | Labovitz et al. | |
| 2003/0120593 A1 * | 6/2003 | Bansal et al. | 705/39 |
| 2003/0200204 A1 * | 10/2003 | Limoges et al. | 707/3 |
| 2005/0114321 A1 | 5/2005 | DeStefano et al. | |
| 2005/0114505 A1 | 5/2005 | DeStefano et al. | |
| 2005/0114706 A1 | 5/2005 | DeStefano et al. | |
| 2005/0114707 A1 | 5/2005 | DeStefano et al. | |
| 2005/0125807 A1 * | 6/2005 | Brady et al. | 719/318 |
| 2006/0265746 A1 | 11/2006 | Farley et al. | |
| 2007/0011308 A1 | 1/2007 | Brady, Jr. et al. | |
| 2007/0011309 A1 | 1/2007 | Brady et al. | |
| 2011/0125725 A1 * | 5/2011 | Daughtrey et al. | 707/706 |
| 2013/0144894 A1 | 6/2013 | DeStefano et al. | |

OTHER PUBLICATIONS

USPTO BPAI decision dated Aug. 20, 2010 for related U.S. Appl. No. 10/897,568, 7 pages.

Yang, et al. "A scalable, Web-based architecture for hierarchical network management", Global Telecommunications Conference, Globecom '99, 1999, pp. 1882-1888.

\* cited by examiner

SYSTEM AND METHOD FOR PARSING, SUMMARIZING AND REPORTING LOG DATA

RELATED APPLICATIONS

This application is a continuation of U.S. patent application Ser. No. 10/992,230, filed Nov. 18, 2004 now U.S. Pat. No. 8,234,256, entitled "System and method for parsing, summarizing and reporting log data", which claims the benefit of U.S. Provisional Patent Application Ser. No. 60/525,401, filed Nov. 26, 2003, entitled "System and Method for Summarizing Log Data" and U.S. Provisional Patent Application Ser. No. 60/525,465, filed Nov. 26, 2003, entitled "System and Method for Parsing Log Data." The disclosures of all applications, including their appendices, are hereby incorporated by reference in their entireties.

BACKGROUND OF THE INVENTION

1. Field of the Invention

This invention relates generally to computer network security and more particularly to a system and method for parsing, summarizing and reporting log data.

2. Description of the Related Art

Security devices such as network firewalls and routers act as data checkpoints that examine and block messages that do not meet specified device policies and security criteria. Network firewalls are frequently used to prevent unauthorized Internet users from accessing private networks connected to the Internet. Typically, all messages entering or leaving a private network, such as an intranet network, pass through a network firewall. The network firewall protects servers, workstations, personal computers, databases, storage devices, and other intranet-connected devices from virulent data, SPAM, and attempts to breech network security. Security schemes using network firewalls generally work well when network traffic is light to moderate. For example, attacks can usually be stopped using intrusion detection software. Later, security staff can manually review firewall log files to assure that proper remedies have been applied, and to gauge the effectiveness of the remedies.

However, as network performance increases and security attacks proliferate, a fundamental problem with network firewalls becomes manifest. A firewall may produce over 10 million various messages (i.e., log data) per day. If this data were printed as quickly as it was created, it would consume a ream of paper in less than 5 minutes. At high network speeds where multiple attacks can occur over a short period of time, existing firewall technology may generate such a large volume of raw log data that human review of the data after a security attack is nearly impossible. The amount of log data generated by security devices and vendors' consoles can quickly overwhelm a security staff, which may cause them to actually disable alarms that generate high volumes of messages. In many cases, the data is simply ignored or lost.

It would be desirable to provide a system and method to capture security log data, analyze it, and report attack information quickly, so that proper security remedies may be applied in a timely manner.

DETAILED DESCRIPTION

Security Administrators need to be able to capture all security log data and have a means to summarize and report attack information quickly so that proper security remedies can be applied in a timely manner. The key to being able to pull useful information from firewall log data is to summarize that data as it is produced. Summarized log data produces smaller data sets which helps lower the storage requirements and allows security administrators to more quickly query and react to the information.

Figure 1:
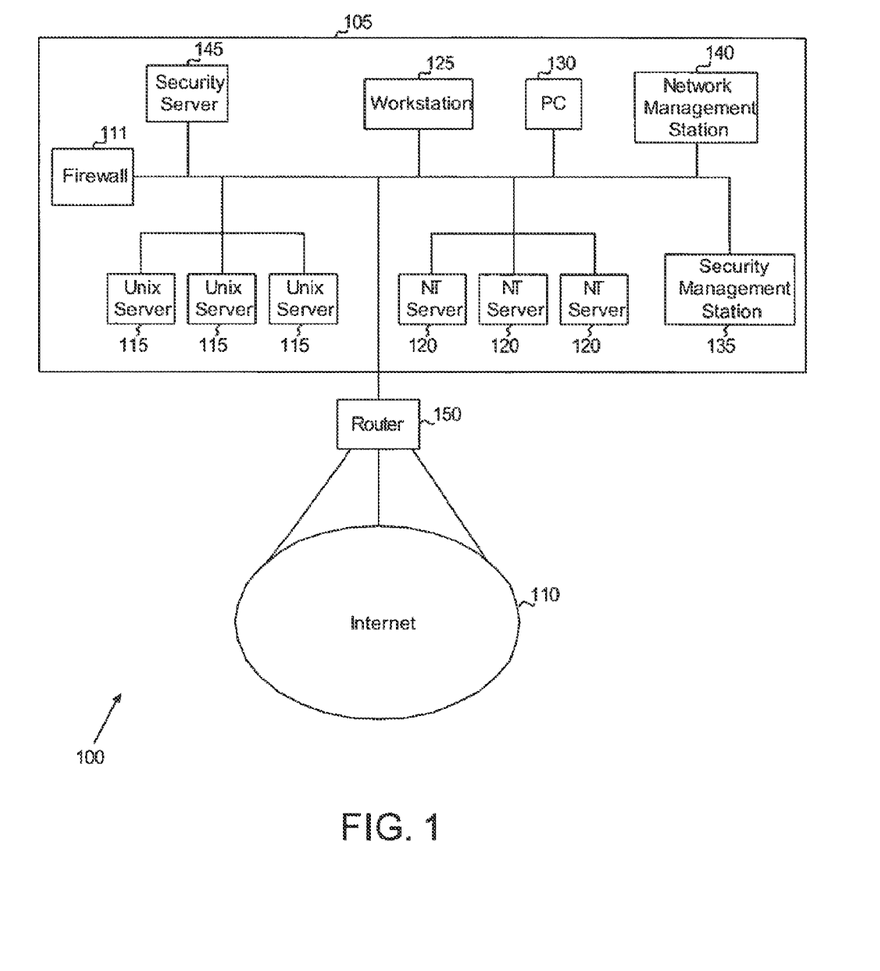
FIG. 1 is a block diagram of an exemplary network, in which an embodiment of the present invention may be implemented.

FIG. 1 is a block diagram of an exemplary network 100, in which an embodiment of the present invention may be implemented. The network 100 comprises an intranet 105 coupled to an Internet 110 via a router 150. The intranet 105 comprises a firewall 111, Unix servers 115, NT servers 120, a workstation 125, a PC 130, a security management station 135, a network management station 140, and a security server 145. According to the present invention, intranet 105 may comprise alternative combinations of the elements illustrated, or may comprise less or additional devices (not shown). For example, the network 100 may not comprise Unix servers 115, or may comprise a plurality of PCs 130 or workstations 125. The firewall 111 may be any type of vendor specific firewall, such as a Cisco PIX or NetScreen firewall. Similarly, router 150 may be any type of vendor-specific router. Typically in operation, the firewall 111 receives messages from the Internet 110, denies or accepts transmission of the messages based upon the firewall's security policy, and generates log messages (also referred to as log data) based upon responses to the received messages by the firewall 111.

In one embodiment of the system illustrated in FIG. 1, the security server 145 is a LogAppliance™ rack-mounted server, manufactured and sold by LogLogic, Inc. The security management station 135 manages operation and control of the security server 145, and may request and display security reports via a security-Web browser. In one embodiment, the security server 145 is configured in hardware. However, the scope of the present invention comprises the implementation of the security server 145 in software or hardware. The security management station 135 typically executes security server driver software and security-Web browser software.

Figure 2:
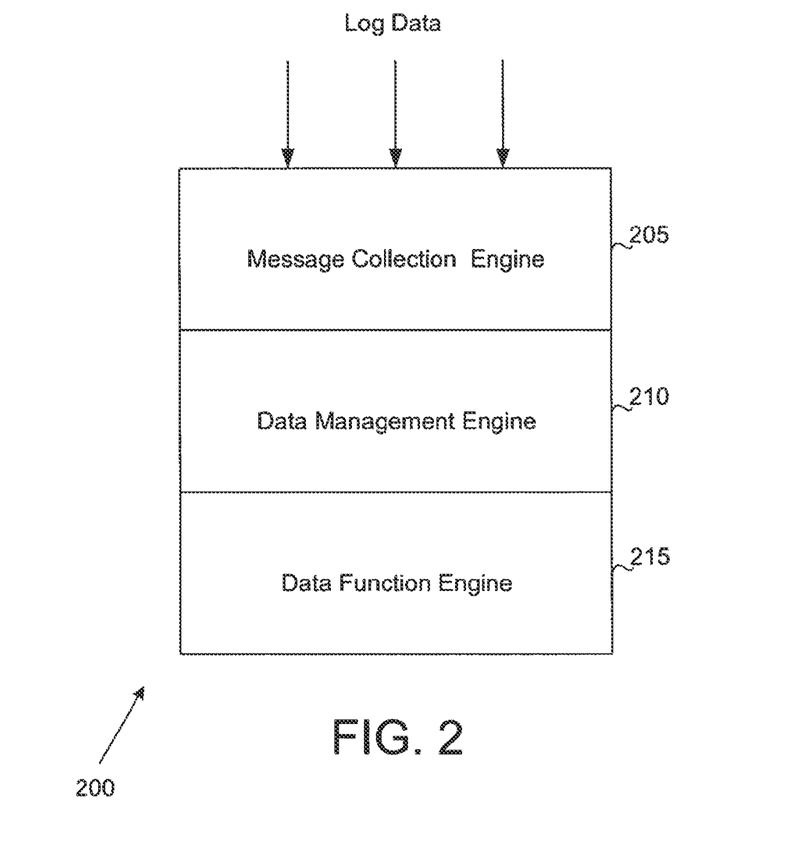
FIG. 2 illustrates an exemplary security platform, according to one embodiment of the present invention.

FIG. 2 illustrates an exemplary security platform 200, according to one embodiment of the present invention. The security platform 200 may be implemented by the security server 145 (FIG. 1) in hardware and/or software, and may be implemented by the security management station 135 in software. The security platform 200 comprises a message collection engine 205, a data management engine 210, and a data function engine 215.

The data management engine 210 manages databases generated by the message collection engine 205 via optimization and data aging algorithms. For example, the data management engine 210 is configured to efficiently and quickly delete old data, manage large volumes of data, and optimize data compression and back-up routines.

The data function engine 215 may comprise platform components such as real time reporting, policy validation, trend and deviation analysis, security analysis, and application programming interfaces (APIs). For example, the data function engine 215 may process requests for a real-time log data report, a report compiled for a specified date or time interval, or a deviation analysis report based upon a comparison of log data to security policy procedures implemented by a given firewall.

Figure 3:
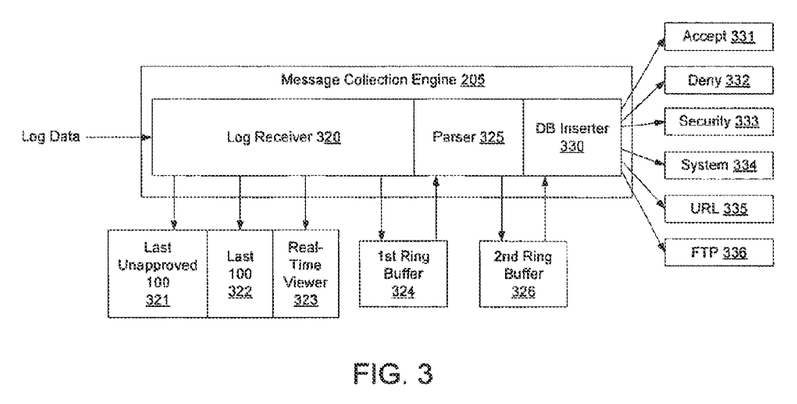
FIG. 3 illustrates the message collection engine of FIG. 2, according to one embodiment of the present invention.

FIG. 3 illustrates the message collection engine 205 of FIG. 2, according to one embodiment of the present invention. The message collection engine 205 comprises a log receiver 320, a parser 325, and a database (DB) inserter 330. The message collection engine 205 may comprise more or less components, or other components.

In operation, the log receiver 320, in exemplary embodiments, receives log data from network security devices (not shown), such as Cisco PIX firewalls, routers, and NetScreen firewalls on a standard UDP port 514. "UDP" is an abbreviation for User Datagram Protocol—a commonly-used protocol for information that requires no response, such as streaming audio and video. In addition, the log receiver 320 may receive Checkpoint log data on a TCP port 18184. In alternative embodiments, the log receiver 320 may receive log data from any type of security device or vendor-specific firewall via any type of communication protocol. The log receiver 320 then processes the log data, and copies the log data to a first ring buffer 324. The log receiver 320 may also copy the data to a last unapproved 100-buffer 321 (i.e., stores last 100 unapproved log messages), a last 100-buffer 322 (i.e., stores last 100 log messages), or a real-time viewer buffer 323, based upon log data content and processes running in the security-browser window.

The log receiver 320 may also receive and store in memory (not shown) security policy information from the security devices. The log receiver 320 then compares the security policy information to the received log data to determine operational effectiveness of the security devices, and to initiate any changes to the security policy.

The exemplary parser 325 parses the log data received from the first ring buffer 324 to extract fields based upon log data message type, and generates Structured Query Language (SQL) statements from the extracted fields. The parser 325 then copies the SQL statements to a second ring buffer 326. Subsequently, the DB inserter 330 inserts the SQL statements into database tables 331-336 in memory, according to the message type. In addition, the message collection engine 205 (FIG. 2) summarizes the SQL statements stored in the database tables over various intervals of time, and copies the summarized SQL statements to tables stored on disk (not shown). The log receiver 320, the parser 325, and the DB inserter 330 will be discussed in more detail further below in conjunction with FIG. 5.

Figure 5:
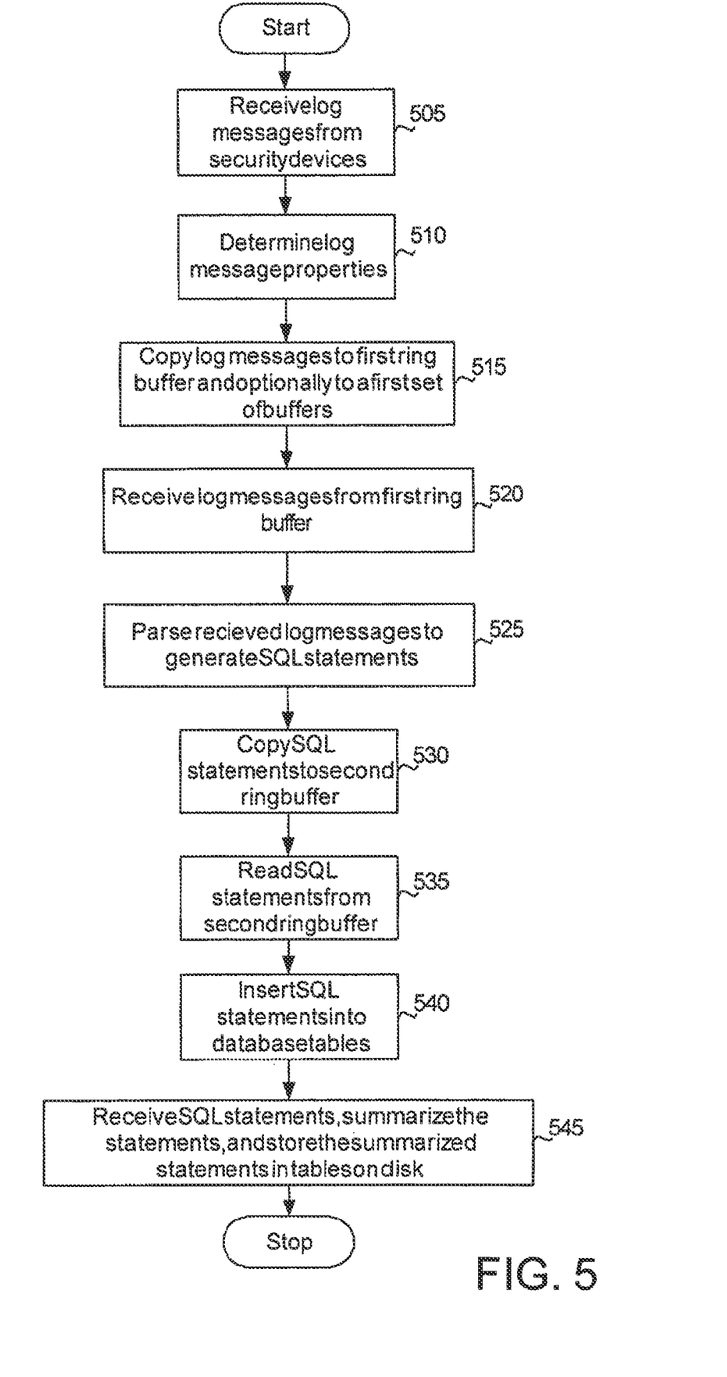
FIG. 5 is a flowchart of exemplary method steps for parsing the log data as implemented by the message collection engine of FIG. 3, according to one embodiment of the present invention.

FIG. 5 is an exemplary flowchart of method steps for parsing the log data as implemented by the message collection engine 205 of FIG. 3, according to one embodiment of the present invention. In step 505, the log receiver 320 (FIG. 3) receives a log message from network security devices (e.g., firewall 111 and router 150 of FIG. 1) on a UDP port 514 or a TCP port 18184. Next, in step 510, the log receiver 320 determines a data source of the log message, and compares the data source with a list of acceptable data sources. If the data source is on the list of acceptable data sources, and if the log receiver 320 determines that the data source is enabled and configured, then the log message is approved for parsing.

Next in step 515, the log receiver 320 copies the log message to the first ring buffer 324 (FIG. 3). The first ring buffer 324 is, in one embodiment, a first-in-first-out (FIFO) ring buffer that reduces a risk of losing log messages due to processing delays in the message collection engine 205. Additionally, the log receiver 320 may optionally copy the approved log message to the real-time viewer buffer 323 (FIG. 3). The real-time viewer buffer 323 stores log messages to be viewed in real-time. For example, a user of the security management station 135 (FIG. 1) may open up a real-time view process (i.e., a window in a security browser) to view log messages received by the log receiver 320 in real-time. The real-time view process accesses the log messages stored in the real-time viewer buffer 323 for display via the security browser window.

Referring back to step 510, if the log receiver 320 determines that the data source is not on the list of acceptable devices, or if the data source is enabled but not configured, then the log receiver 320 copies the log message to the last unapproved 100-buffer 321 or the last 100-buffer 322. In one embodiment of the invention, the last unapproved 100-buffer 321 and the last 100-buffer 322 are 100-entry ring buffers. The user of the security management station 135 may further analyze the data stored in the 100-entry ring buffers for troubleshooting analysis purposes, for example. Alternative embodiments of these buffers 321, 322, and 323 may comprise other value entry ring buffers.

Next in step 520, the parser 325 (FIG. 3) reads a log message from the first ring buffer 324 (FIG. 3). In one embodiment of the invention, the first ring buffer 324 is a FIFO ring buffer. Then in step 525, the parser 325 extracts data fields from the log message, and converts the extracted data fields to an SQL statement. For example, in one embodiment of the present invention, the parser 325 searches the log message for predetermined keywords to identify message type. Once the message type is identified, the parser 325 utilizes a pre-determined function associated with the message type to extract the data fields. That is, the data fields are extracted by application of the pre-determined function to the log message.

In step 530, the parser 325 copies the SQL statement to the second ring buffer 326. In one embodiment of the invention, the second ring buffer 326 is a FIFO ring buffer. Next, in step 535, a database (DB) inserter 330 (FIG. 3) reads an SQL statement from the second ring buffer, and examines the SQL statement to determine a corresponding database table 331-336 (FIG. 3). In step 540, the DB inserter 330 inserts the SQL statement into the corresponding database table 331-336. According to the present invention, database tables 331-336 may comprise an accept table 331, a deny table 332, a security table 333, a system table 234, a URL table 335, and an FTP table 336. In alternative embodiments, the present invention may comprise any combination of database tables 331-336 or other categories of database tables.

The second ring buffer 326 may advantageously receive database insert queries (e.g., SQL statements) from processes other than the parser 325. That is, the second ring buffer 326 is configured to receive database insert queries from multiple processes, thus providing for a scalable parsing routine. Furthermore, the second ring buffer may store the received database insert queries in a queue, thus reducing a risk of losing data before the data is inserted into the appropriate database tables 331-336 via the DB inserter 330. In addition, the present invention utilizes a single database connection (i.e., the DB inserter 330) to execute insertion statements against the database tables 331-336, thus providing a single controlled entry point to the database tables 331-336. Thus, the DB inserter 330 streamlines insertion of data from multiple sources into the database tables 331-336, reducing I/O conflicts and processing delays.

In exemplary embodiments, the DB inserter 330 copies approximately 99% of the SQL statements to the accept and the deny database tables 331 and 332, respectively. The SQL statement is sent to the deny database table 332 when the SQL statement's corresponding log message received by the network security device (e.g., firewall 111) is denied based on the network security device's policy list. Conversely, if a message received by the network security device is not denied, then the message is accepted. If the accepted message is a system message related to the security device's activity (e.g., number of connections passing through the security device), then the corresponding SQL statement is copied to the system database table 334. However, if the accepted message relates to a network user accessing a particular URL site, then the corresponding SQL statement is copied to the URL database table 335. Further, if the accepted message relates to a network user requesting a file transfer protocol (FTP) service, then the corresponding SQL statement is copied to the FTP database table 336. According to one embodiment, should the database inserter 330 determine that the accepted message does not belong to system 334, URL 335, FTP 336, or security 333 database tables, then the database inserter copies the SQL statement to the accept database table 331. The present invention may comprise any number of database tables.

Next, in step 545, the message collection engine 205 (FIG. 2) reads the SQL statements from the accept and deny database tables 331 and 332, summarizes the statements over one or more predetermined time intervals, and copies the summarized statements to tables on disk (not shown). Step 545 is described in more detail below.

The message collection engine 205 may comprise other components that parse log messages received from external security devices to generate SQL statements that are stored in database tables.

The data management engine 210 manages databases and data generated by the message collection engine 205 via summarization, aggregation, optimization and data aging algorithms. For example, the data management engine 210 is configured to manage large volumes of data, efficiently and quickly delete old data, and optimize data compression and back-up routines. The data management engine 210 will be discussed in more detail in connection with FIG. 4.

Figure 4:
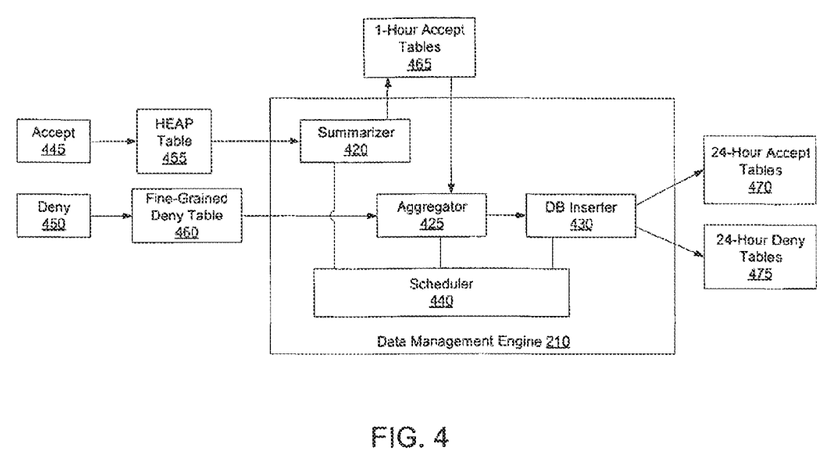
FIG. 4 illustrates the data management engine of FIG. 2, according to one embodiment of the present invention.

FIG. 4 illustrates the data management engine 210 of FIG. 2, according to one embodiment of the present invention. The data management engine 210 comprises a summarizer 420, an aggregator 425, a database (DB) inserter 430, and a scheduler 440. The data management engine 210 may comprise more or less components, or other components. In addition, FIG. 4 illustrates an accept database table 445, a deny database table 450, and a HEAP table (i.e., memory table) 455 stored in memory (not shown) of the security server 145 (FIG. 1) or the security management station 135 (FIG. 1). Furthermore, FIG. 4 illustrates a fine-gained deny table 460, 1-hour accept tables 465, 24-hour accept tables 470, and 24-hour deny tables 475 stored on a system disc (not shown) coupled to the either the security server 145 or the security management station 135, or both. In alternative embodiments of the invention, the tables 465, 470, and 475 may be configured to store data over other periods of time (e.g., 10-minute accept tables to 30-day accept and deny tables). In one embodiment of the invention, the fine-grained deny table 460 stores data for thirty days. That is, the data management engine deletes any data over thirty days old from the fine-grained deny table 460.

In one embodiment of the invention, the scheduler 440 controls and manages operation of the summarizer 420, the aggregator 425, and the DB inserter 430. Furthermore, the scheduler 440 (or another process of the security platform 200) may continuously copy SQL statements from the accept database table 445 to the HEAP table 455, and SQL statements from the deny database table 450 to the fine-grained deny table 460. According to one embodiment, the HEAP table 455 buffers the accept SQL statements for 10 minutes. Alternative embodiments may use different time intervals. The scheduler also instructs the summarizer 420 and the aggregator 425 to summarize and aggregate, respectively, the SQL statements stored in the HEAP table 455 and the fine-grained deny table 460 over various intervals of time. The data management engine 210 then copies the summarized and aggregated SQL statements to tables 465, 470, and 475 stored on the system disk. In alternative embodiments, the data management engine 210 copies the summarized and aggregated SQL statements to tables 465, 470, and 475 stored on a distributed disk system (not shown). The summarizer 420, the aggregator 425, the DB inserter 430, and the scheduler 410 will be discussed in more detail further below in conjunction with FIGS. 6 through 9, inclusive.

Figure 6:
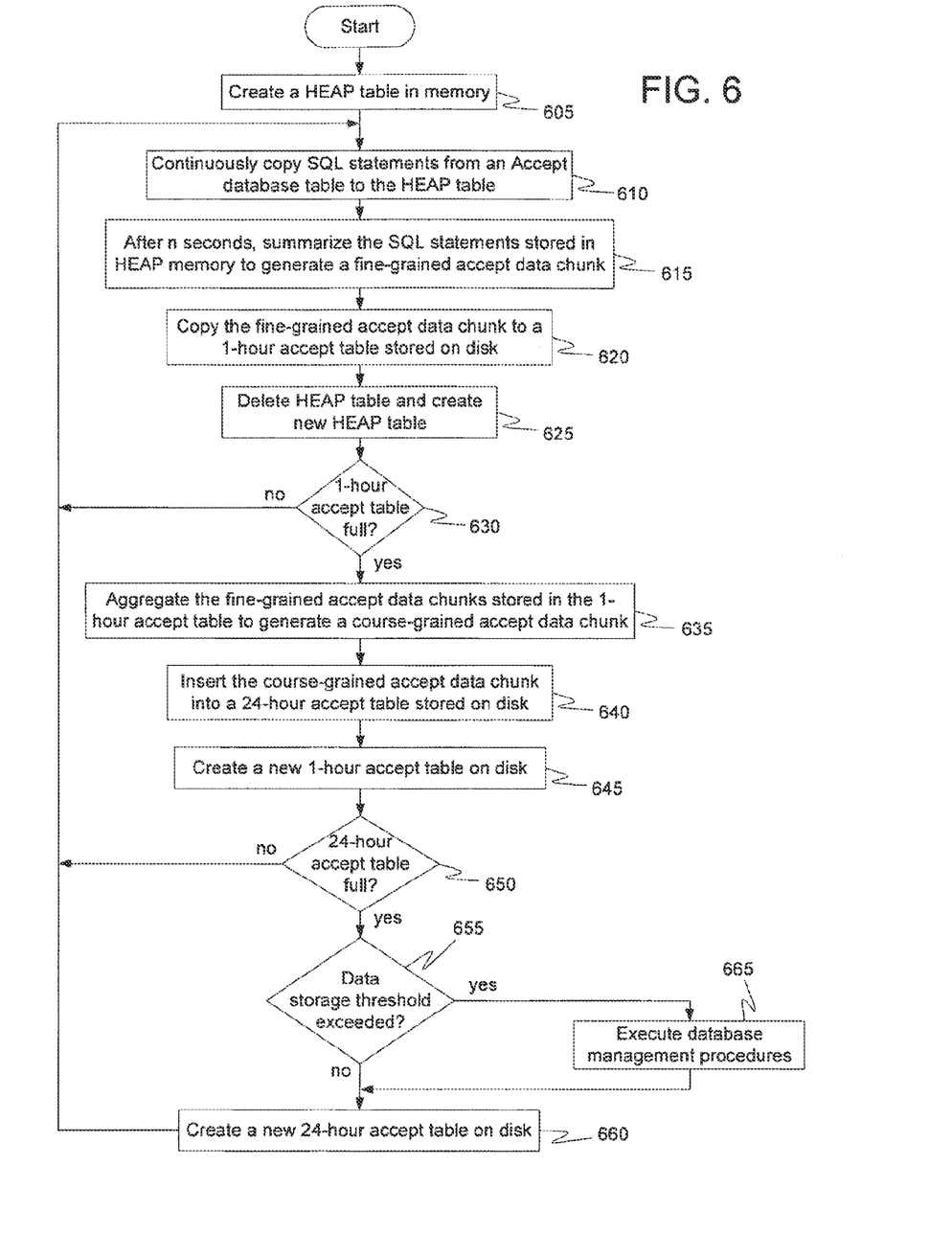
FIG. 6 is an exemplary flowchart of method steps for summarizing the log data stored in the accept database table of FIG. 3, according to one embodiment of the present invention.

FIG. 6 is an exemplary flowchart of method steps for summarizing the log data stored in the accept database table 445 (FIG. 4) as implemented by the data management engine 210 (FIG. 4), according to one embodiment of the present invention. In the exemplary embodiment, a CPU (not shown) of the security management station 135 (FIG. 1) executes instructions corresponding to processes launched by the security-Web browser software. For example, the CPU executes the scheduler 440 (FIG. 4) that manages, controls, and initiates other processes of the message collection engine for summarizing the log data.

In step 605, the data management engine 210 creates the HEAP table 455 (FIG. 4) in local memory of security management station 135 or local memory of the security server 145 (FIG. 1). In one embodiment of the invention, the HEAP table is a pre-table created in random access memory (RAM) with a lifetime of n seconds. According to one embodiment of the present invention, n is a pre-determined variable with a range of 10-600 seconds. That is, every n seconds, the scheduler 440 deletes the HEAP table 455 and creates a new HEAP table (not shown). Next, in step 610, the data management engine 210 initiates a process that continuously copies SQL statements stored in the accept database table 445 to the HEAP table 455.

Then, in step 615, the scheduler 440 instructs the summarizer 420 to summarize the SQL statements stored in the HEAP table over the n second interval to generate a fine-gained accept data chunk. According to the present invention, the summarizer 440 determines those SQL statements that share a commonality of one or more predetermined fields, and combines (i.e., condenses) those statements into a smaller number of statements or messages. For example, a SQL statement may include the following fields: a source IP, a source port, a destination IP, and a destination port. Typically, for every connection to the firewall 111 (FIG. 1), the firewall 111 generates a log messages that comprises a source port number that has no significant security meaning. Therefore, if a user of network 100 (FIG. 1) connects with a single Web server that initiates 50 connections to the firewall, for example, then the firewall 111 generates 50 log messages, each perhaps with a different source port number. However, each of the 50 messages has identical source IP, destination IP, and destination port numbers, because the user is connected to the single Web server.

Accordingly, in one embodiment of the present invention, the summarizer 420 determines which sets of SQL statements have identical source IP, destination IP, and destination port numbers, irrespective of the source port numbers of the SQL statements. The summarizer 420 then creates a new statement (i.e., message) generated from the 50 messages, for example. The summarizer 420 may repeat the above summarization process over the SQL statements stored in the HEAP table 455 for other fields of commonality to create other new condensed statements. Thus, in one embodiment of the invention, the summarizer creates a fine-grained accept data chunk comprising a condensation of the SQL statements stored in the HEAP table, based upon predefined fields of commonality (e.g., source IP, destination IP, and destination port numbers) and one or more fields of uniqueness (e.g., source port number).

In addition, the summarizer 420 may also summarize integer fields associated with the SQL statements stored in the HEAP table 455, such as number of in-bytes (bytes flowing through the firewall 111 from the Internet 105 (FIG. 1) to the intranet 110 (FIG. 1)), number of out-bytes (bytes flowing through the firewall 111 from the intranet 110 to the Internet 105), and number of messages passing through the firewall 111.

Next, in step 620, the data management engine 210 copies the fine-grained accept data chunk to a 1-hour accept table 465 stored on the system disk (not shown). In step 625, the data management engine 210 deletes the HEAP table and creates a new HEAP table in local memory. Next, in step 630, the data management engine 210 determines if the 1-hour accept table is full. For example, if n=600 s (i.e., 10 minutes), then the 1-hour accept table may comprise up to six fine-grained accept data chunks, since each fine-grained accept data chunk comprises a ten minute summary of SQL statements. According to the present invention, the 1-hour accept data table may comprise up to 3600/n fine-grained accept data chunks.

If, in step 630, the data management engine 210 determines that the 1-hour accept table is not full (i.e., the 1-hour accept table comprises less than 3600/n fine-grained accept data chunks), then the method continues at step 610. However, if the data management engine 210 determines that the 1-hour accept table is full (i.e., the 1-hour accept table comprises 3600/n fine-gained accept data chunks), then in step 635, the scheduler 440 instructs the aggregator 425 to aggregate (i.e., perform a second summarization on) the fine-grained accept data chunks stored in the 1-hour accept table to generate a coarse-grained accept data chunk. According to the present embodiment, the coarse-grained accept data chunk comprises a one-hour period of data. Alternative embodiments of the invention may comprise coarse-grained data chunks with other time periods. Next, in step 640, the data management engine 210 sends the coarse-grained accept data chunk to the DB inserter 430 (FIG. 4), and the DB inserter 430 inserts the coarse-grained accept data chunk into a 24-hour accept table 470 stored on the system disk.

Next, in step 645, the data management engine 210 creates another 1-hour accept table 465, and in step 650, determines if the 24-hour accept table 470 comprises twenty-four coarse-grained accept data chunks (i.e., if the 24-hour accept table 470 is full). However, if the 24-hour accept table 470 is not full, then the method continues at step 610. When the 24-hour accept table 470 is full, the data management engine 210 determines whether a predetermined data storage threshold is exceeded. According to one embodiment of the present invention, the data storage threshold is a maximum amount of disk storage space allotted for storage of 1-hour accept tables 465, 24-hour accept tables 470, 24-hour deny tables 475, and fine-grained deny tables 460. If in step 635, the data management engine 210 determines that the data storage threshold is not exceeded, then in step 660, the data management engine 210 creates a new 24-hour accept table 470, and the method continues at step 610. However, if the data management engine 210 determines that the data storage threshold is exceeded, the data management engine 210 executes database management procedures in step 665.

In exemplary embodiments of the invention, the data management engine 210 may execute database management procedures such as deletion of tables 460, 465, 470, and 475 with specific creation dates, issuance of user notifications to initiate data-backup procedures, or initiation of data compression schemes to free-up disk space. In one embodiment of the invention, the data management engine 210 uses the "merge table" feature in MySQL that allows data management processes to view tables 460, 465, 470, and 475 with identical schemas as a single parent table (not shown). That is, the parent table is a table of pointers that allows data management processes to efficiently manage large sets of tables comprising large amounts of data, and to: (1) delete old data quickly; (2) allow for efficient compression of selected tables; and, (3) allow for efficient back-up of selected tables to other storage devices.

Figure 7:
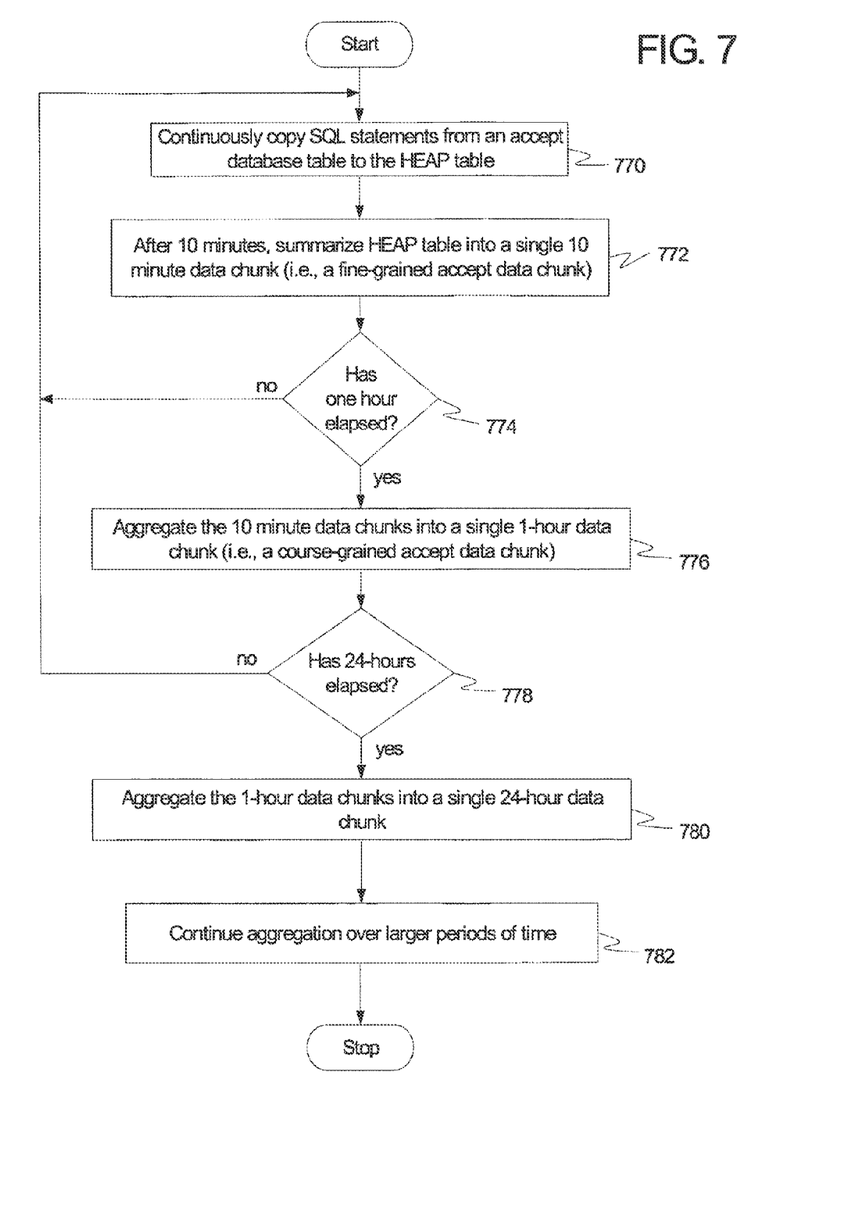
FIG. 7 is an exemplary flowchart of method steps for summarizing the log data stored in the accept database table of FIG. 3, according to another embodiment of the present invention.

FIG. 7 is an exemplary flowchart of method steps for summarizing the log data stored in the accept database table 445 (FIG. 4) as implemented by the data management engine 210 (FIG. 4), according to another embodiment of the present invention. In step 772, the scheduler 440 (FIG. 4) instructs the summarizer 420 (FIG. 4) to summarize SQL statements stored in the HEAP table 455 (FIG. 4) into single 10-minute data chunks after every 10-minute interval of time. In alternative embodiments, the summarizer 420 summarizes SQL statements stored in the HEAP table 455 over other predefined intervals of time.

Furthermore, in steps 774 and 776, the scheduler 440 instructs the aggregator 425 to aggregate the 10-minute data chunks into a single 1-hour data chunk after every 1-hour interval of time. Then in optional steps 778 and 780, the scheduler 440 may instruct the aggregator 425 to aggregate the 1-hour data chunks into a single 24-hour data chunk after every 24-hour interval of time. In step 782, the scheduler 440 may then instruct the aggregator 425 to aggregate the data chunks over larger intervals of time. In the FIG. 7 embodiment of the invention, the summarizer 420 and aggregator 425 are instructed to summarize and aggregate data chunks based upon elapsed intervals of time.

Figure 8:
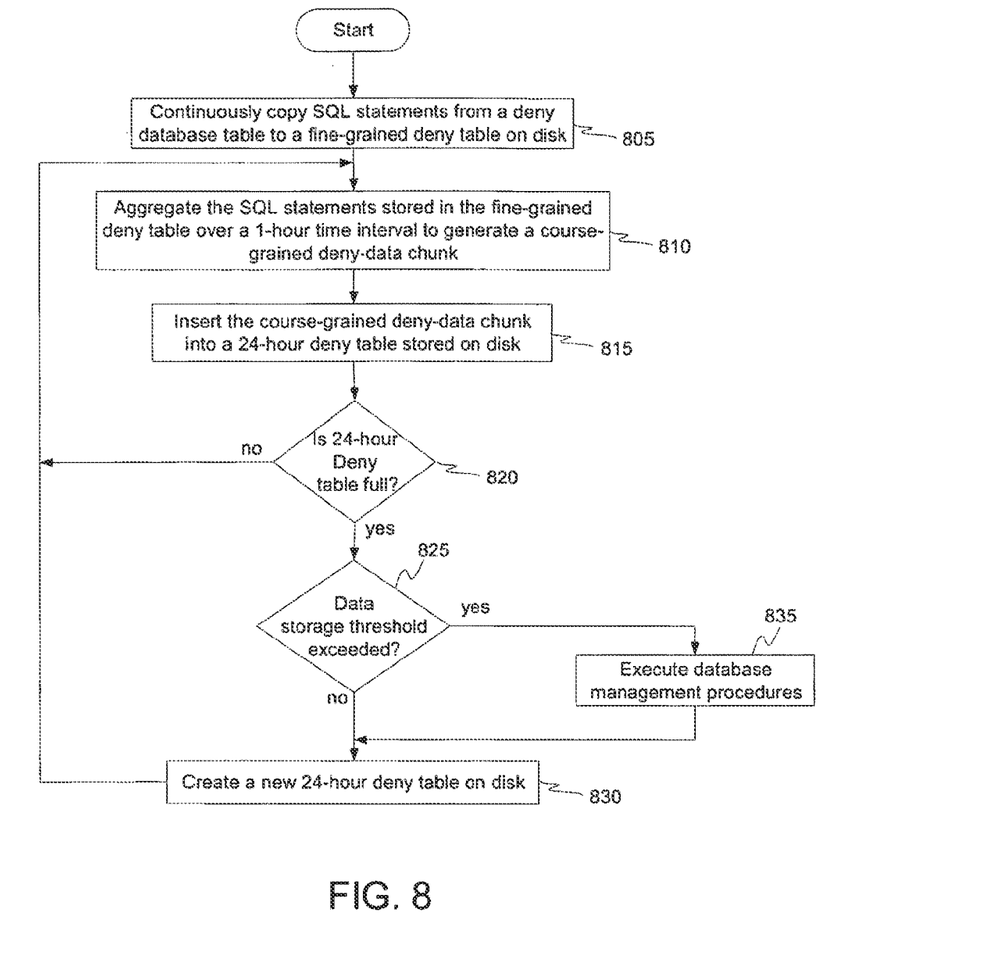
FIG. 8 is an exemplary flowchart of method steps for aggregating log data stored in the deny database table of FIG. 3, according to one embodiment of the present invention; and, FIG. 9 is an exemplary flowchart of method steps for summarizing the log data stored in the deny database table of FIG. 3, according to another embodiment of the present invention.

FIG. 8 is an exemplary flowchart of method steps for aggregating log data stored in the deny database table 450 (FIG. 4) as implemented by the data management engine 210 (FIG. 4), according to one embodiment of the present invention.

In step 805, the data management engine 210 initiates a process that continuously copies each SQL statement stored in the deny database table 450 to a fine-grained deny table 460 stored on the system disk. Next, in step 810, the scheduler 440 instructs the aggregator 425 to aggregate (i.e., summarize) the SQL statements stored in the fine-gained deny table 460 over a one-hour time interval to generate a coarse-grained deny data chunk for the one-hour time interval. Then, in step 815, the data management engine 210 sends the coarse-grained deny data chunk to the DB inserter 430 (FIG. 4), and the DB inserter 430 inserts the coarse-grained deny data chunk into a 24-hour deny table 475 stored on the system disk.

Next, in step 820, the data management engine 210 determines if the 24-hour deny table 475 comprises 24 coarse-grained deny data chunks (i.e., if the 24-hour deny table 475 is full). However, if the 24-hour deny table 475 is not full, then the method continues at step 810. When the 24-hour deny table 475 is full, then the data management engine 210 determines whether the predetermined data storage threshold is exceeded in step 825. If the data management engine 210 determines that the data storage threshold is not exceeded, then in step 830, the data management engine 210 creates a new 24-hour deny table, and the method continues at step 810. However, if the data management engine 210 determines that the data storage threshold is exceeded, the data management engine 210 initiates database management procedures in step 835, and the method continues at step 830. Step 835 is similar to step 665 (FIG. 6), and is not discussed further.

Figure 9:
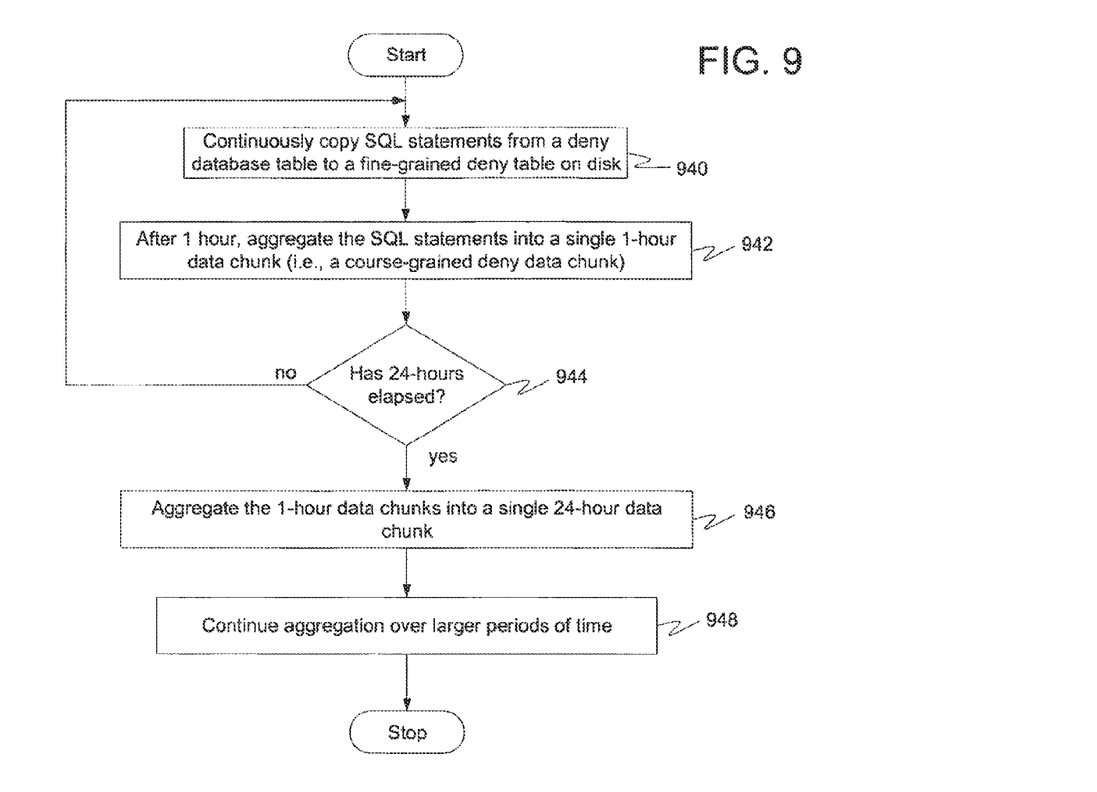

FIG. 9 is an exemplary flowchart of method steps for summarizing the log data stored in the deny database table 450 (FIG. 4) as implemented by the data management engine 210 (FIG. 4), according to another embodiment of the present invention. In step 942, the scheduler 440 (FIG. 4) instructs the aggregator 425 (FIG. 4) to aggregate SQL statements stored in the fine-grained deny table 460 (FIG. 4) into single 1-hour data chunks after every 1-hour interval of time. In alternative embodiments, the aggregator 425 aggregates SQL statements stored in the fine-grained deny table 460 over other predefined intervals of time.

Then in optional steps 944 and 946, the scheduler 440 may instruct the aggregator 425 to aggregate the 1-hour data chunks into a single 24-hour data chunk after every 24-hour interval of time. In step 948, the scheduler 440 may then instruct the aggregator 425 to aggregate the data chunks over larger intervals of time. In the FIG. 9 embodiment of the invention, the aggregator 425 is instructed to aggregate data chunks based upon elapsed intervals of time.

The data management engine 210 (FIG. 4) of the present invention summarizes and aggregates large amounts of data comprising log messages, and generates smaller amounts of data comprising summarized and aggregated deny and accept log messages stored in 24-hour accept and deny tables, and 1-hour accept tables on a system disk. The data management engine 210 of the present invention allows for efficient storage of data to disk, and quick and efficient retrieval of disk data, compression of disk data, deletion of disk data, and back-up of disk data to other data storage devices. In addition, the present invention allows a user to search the fine-grained deny table 460 (FIG. 4) for a more detailed description of an event stored in the 24-hour deny tables 475 (FIG. 4).

Example I

Parsing Log Data

Firewall log files are traditionally text strings of messages describing all the firewall activities. These messages can be categorized into accepted messages, denied messages, security event messages, and firewall system messages. Once categorized, each message can subsequently be broken down or parsed into its essential information. A portion of a log file from a Cisco PIX firewall is reproduced in Table I.

TABLE I

| | |
|---|---|
| 1 | %PIX-6-302015: Built outbound UDP connection 10683 for outside:207.69.188.185/53 (207.69.188.185/53) to inside:192.168.1.100/1045 (24.145.191.42/2710) |
| 2 | %PIX-6-302016: Teardown UDP connection 10683 for outside:207.69.188.185/53 to inside:192.168.1.100/1045 duration 0:00:01 bytes 384 |
| 3 | %PIX-6-305011: Built dynamic TCP translation from inside:192.168.1.100/2577 to outside:24.145.191.42/9006 |
| 4 | %PIX-6-302013: Built outbound TCP connection 10684 for outside:193.108.95.49/80 (193.108.95.49/80) to inside:192.168.1.100/2577 (24.145.191.42/9006) |
| 5 | %PIX-5-304001: 192.168.1.100 Accessed URL 193.108.95.49:/f/1917/8668/6H/espn.go.com/insertfiles/css/sportindex.css |
| 6 | %PIX-6-302015: Built outbound UDP connection 10685 for outside:207.69.188.185/53 (207.69.188.185/53) to inside:192.168.1.100/1045 (24.145.191.42/2710) |
| 7 | %PIX-6-302016: Teardown UDP connection 10685 for outside:207.69.188.185/53 to inside:192.168.1.100/1045 duration 0:00:01 bytes 186 |
| 8 | %PIX-6-305011: Built dynamic TCP translation from inside:192.168.1.100/2578 to outside:24.145.191.42/9007 |
| 9 | %PIX-6-302013: Built outbound TCP connection 10686 for outside:199.181.132.157/80 (199.181.132.157/80) to inside:192.168.1.100/2578 (24.145.191.42/9007) |

A first step in organizing log data may be to parse the text strings into categories or fields that make up the message text. For example the first message in Table I can be parsed into the following fields:

Message code=% PIX-6-302015 (which means build outbound UDP connection

Connection=10683

Source IP=192.168.1.100

Source port=1045

Destination IP=185

Destination port=53

NAT IP=24.145.191.42

NAT port=2710

Once the message is parsed into its fields, it may be advantageous to store the data in compressed form, for example, compressed integer form, in a database table for later queries. This process can reduce the storage requirements of each text message to less than 25% of its original size.

Summarizing the Parsed Data

In one exemplary situation, if a firewall is logging all messages, without filtering of messages, then the vast majority, usually over 80%, of the messages will likely be based on accepted TCP and UDP connections. To illustrate this point if a PC on the inside of a firewall opens up its browser to a typical web site and goes through a firewall, that firewall may produce 40 TCP built messages and 40 TCP teardown messages for a total of 80 log messages based on that one web page. If the firewall is doing network address translation, then that firewall will produce an additional 40 translate messages for that web page.

TCP build and teardown messages have similar formats that may include the following information: message codes, Source IP address, Source port number, Destination IP address, Destination port number, and number of bytes in the connection.

Referring again to Table 1, it can be seen that messages 1, 2, 6 and 7 share the same Source IP (192.168.1.100), Destination IP (207.69.188.185), and Destination port (53). These messages indicate that the internal PC with an IP address of 192.168.1.100 is querying an external domain name server with an IP address of 207.69.168.185 for a host address.

Since all of the messages in Table I occurred in the same minute, in most cases it would be a waste of storage space to save all four messages. Those four messages can be summarized into the following:

Message code=Accepted
Message number=4
Source IP=192.168.1.100
Destination IP=207.69.188.185
Destination port=53
NAT IP=24.145.191.42

By using a combination of parsing and summarization techniques, the dataset of the log files can typically be reduced to less than 5% of the original message text. The benefits of this reduction in the dataset are not limited to storage capacity reduction, it also speeds up the backend processing for report generation. By working with a dataset less than 5% of its original size, queries against that dataset will benefit by not having to search through extra data.

The present invention has been described above with reference to exemplary embodiments. Other embodiments will be apparent to those skilled in the art in light of this disclosure. Furthermore, the present invention may readily be implemented using configurations other than those described in the exemplary embodiments above. Therefore, these and other variations upon the exemplary embodiments are covered by the claims of the present invention.

What is claimed is:

1. A data processing system comprising:
one or more computers;
a log-producing device connected to the one or more computers through a network; and,
a non-transitory storage device storing computer instructions operable to cause the one or more computers to perform operations comprising:
 receiving, by a log receiver, a log message from the log-producing device;
 determining, by the log receiver, a property of the log message;
 copying, by the log receiver, the log message into a first storage buffer;
 parsing, by a log parser, content of the first storage buffer, including:
  extracting data fields from the log message in the first storage buffer; and
  converting the extracted data fields into one or more structured query language statements;
 copying, by the log parser, the one or more structured query language statements into a second storage buffer;
 reading, by a database inserter, the one or more structured query language statements in the second storage buffer, wherein reading the one or more structured query language statements comprises examining each of the one or more structured query language statements by the database inserter to determine a respective database table for storing a corresponding structured query language statement of the one of more structured query language statements;
 inserting, by the database inserter, each of the one or more structured query language statements into a corresponding database table; and
 summarizing, by a message collection engine, the one or more structured query language statements in the one or more database tables into summarized statements for storing on the non-transitory storage device.

2. The data processing system of claim 1, wherein determining the property of the log message comprises:
 determining whether the log-producing device is an approved data source, wherein the determining comprises comparing the log-producing device with a group of acceptable data sources;
 determining whether the log-producing device is enabled and configured; and
 upon the determining that the log-producing device is an approved data source and that the log-producing device is enabled and configured, approving the log message for parsing.

3. The data processing system of claim 2, wherein determining the property of the log message comprises:
 upon the determining that the log-producing device is not an approved data source, or upon the determining that the log-producing device not configured, copying, by the log receiver, the log message into an unapproved ring buffer configured to store a given number of log messages.

4. The data processing system of claim 1, wherein:
 each of the first storage buffer and the second storage buffer is a first-in-first-out ring buffer; and
 at least one of the first storage buffer or the second storage buffer includes a real-time view buffer configured to store the log message for real-time viewing.

5. The data processing system of claim 1, wherein extracting the data fields from the log message in the first storage buffer comprises:
 searching the log message for one or more predetermined keywords;
 determining a message type of the log message based on a result of the searching; and
 extracting the data fields using a pre-determined function associated with the message type.

6. The data processing system of claim 1, wherein:
 each database table comprises at least one of an accept table, a deny table, a security table, a system table, a uniform resource locator (URL) table, or a file transfer protocol (FTP) table, and
 inserting each of the one or more structured query language statements into the corresponding database table comprises:
  inserting the structured query language statement into the deny table when the log message corresponding to the structured query language statement indicates a denial by the log-producing device;
  inserting the structured query language statement into the system table when the log message corresponding to the structured query language statement indicates a system activity of the log-producing device;

inserting the structured query language statement into the URL table when the log message corresponding to the structured query language statement relates to a network user accessing a URL site;

inserting the structured query language statement into the FTP table when the log message corresponding to the structured query language statement relates to a network user requesting FTP service, or inserting the structured query language statement into the accept table.

7. The data processing system of claim 1, wherein the second storage buffer is configured to receive structured query language statements from a plurality of procedures and to store the received structured query language statements in a queue.

8. A method comprising:

receiving, by a log receiver, a log message from the log-producing device;

determining, by the log receiver, a property of the log message;

copying, by the log receiver, the log message into a first storage buffer;

parsing, by a log parser, content of the first storage buffer, including:

extracting data fields from the log message in the first storage buffer; and converting the extracted data fields into one or more structured query language statements;

copying, by the log parser, the one or more structured query language statements into a second storage buffer;

reading, by a database inserter, the one or more structured query language statements in the second storage buffer, wherein reading the one or more structured query language statements comprises examining each of the one or more structured query language statements by the database inserter to determine a respective database table for storing a corresponding structured query language statement of the one or more structured query language statements;

inserting, by the database inserter, each of the one or more structured query language statements into a corresponding database table; and summarizing, by a message collection engine, the one or more structured query language statements in the one or more database tables into summarized statements for storing on a non-transitory storage device, wherein the method is performed by one or more computers.

9. The method of claim 8, wherein determining the property of the log message comprises:

determining whether the log-producing device is an approved data source, wherein the determining comprises comparing the log-producing device with a group of acceptable data sources;

determining whether the log-producing device is enabled and configured; and upon the determining that the log-producing device is an approved data source and that the log-producing device is enabled and configured, approving the log message for parsing.

10. The method of claim 9, wherein determining the property of the log message comprises:

upon the determining that the log-producing device is not an approved data source, or upon the determining that the log-producing device not configured, copying, by the log receiver, the log message into an unapproved ring buffer configured to store a given number of log messages.

11. The method of claim 8, wherein:

each of the first storage buffer and the second storage buffer is a first-in-first-out ring buffer; and at least one of the first storage buffer or the second storage buffer includes a real-time view buffer configured to store the log message for real-time viewing.

12. The method of claim 8, wherein extracting the data fields from the log message in the first storage buffer comprises:

searching the log message for one or more predetermined keywords;

determining a message type of the log message based on a result of the searching; and extracting the data fields using a pre-determined function associated with the message type.

13. The method of claim 8, wherein:

each database table comprises at least one of an accept table, a deny table, a security table, a system table, a uniform resource locator (URL) table, or a file transfer protocol (FTP) table, and inserting each of the one or more structured query language statements into the corresponding database table comprises:

inserting the structured query language statement into the deny table when the log message corresponding to the structured query language statement indicates a denial by the log-producing device;

inserting the structured query language statement into the system table when the log message corresponding to the structured query language statement indicates a system activity of the log-producing device;

inserting the structured query language statement into the URL table when the log message corresponding to the structured query language statement relates to a network user accessing a URL site;

inserting the structured query language statement into the FTP table when the log message corresponding to the structured query language statement relates to a network user requesting FTP service, or inserting the structured query language statement into the accept table.

14. The method of claim 8, wherein the second storage buffer is configured to receive structured query language statements from a plurality of procedures and to store the received structured query language statements in a queue.

15. A non-transitory storage device storing computer instructions operable to cause one or more computers to perform operations comprising:

receiving, by a log receiver, a log message from the log-producing device;

determining, by the log receiver, a property of the log message;

copying, by the log receiver, the log message into a first storage buffer;

parsing, by a log parser, content of the first storage buffer, including:

extracting data fields from the log message in the first storage buffer; and converting the extracted data fields into one or more structured query language statements;

copying, by the log parser, the one or more structured query language statements into a second storage buffer;

reading, by a database inserter, the one or more structured query language statements in the second storage buffer, wherein reading the one or more structured query language statements comprises examining each of the one or more structured query language statements by the database inserter to determine a respective database table for storing a corresponding structured query language statement of the one or more structured query language statements;

inserting, by the database inserter, each of the one or more structured query language statements into a corresponding database table; and summarizing, by a message collection engine, the one or more structured query language statements in the one or more database tables into summarized statements for storing on the non-transitory storage device.

16. The non-transitory storage device of claim 15, wherein determining the property of the log message comprises:

determining whether the log-producing device is an approved data source, wherein the determining comprises comparing the log-producing device with a group of acceptable data sources;

determining whether the log-producing device is enabled and configured; and upon the determining that the log-producing device is an approved data source and that the log-producing device is enabled and configured, approving the log message for parsing.

17. The non-transitory storage device of claim 16, wherein determining the property of the log message comprises:

upon the determining that the log-producing device is not an approved data source, or upon the determining that the log-producing device not configured, copying, by the log receiver, the log message into an unapproved ring buffer configured to store a given number of log messages.

18. The non-transitory storage device of claim 15, wherein:

each of the first storage buffer and the second storage buffer is a first-in-first-out ring buffer; and at least one of the first storage buffer or the second storage buffer includes a real-time view buffer configured to store the log message for real-time viewing.

19. The non-transitory storage device of claim 15, wherein extracting the data fields from the log message in the first storage buffer comprises:

searching the log message for one or more predetermined keywords;

determining a message type of the log message based on a result of the searching; and extracting the data fields using a pre-determined function associated with the message type.

20. The non-transitory storage device of claim 15, wherein:

each database table comprises at least one of an accept table, a deny table, a security table, a system table, a uniform resource locator (URL) table, or a file transfer protocol (FTP) table, and inserting each of the one or more structured query language statements into the corresponding database table comprises:

inserting the structured query language statement into the deny table when the log message corresponding to the structured query language statement indicates a denial by the log-producing device;

inserting the structured query language statement into the system table when the log message corresponding to the structured query language statement indicates a system activity of the log-producing device;

inserting the structured query language statement into the URL table when the log message corresponding to the structured query language statement relates to a network user accessing a URL site;

inserting the structured query language statement into the FTP table when the log message corresponding to the structured query language statement relates to a network user requesting FTP service, or inserting the structured query language statement into the accept table.

21. The non-transitory storage device of claim 15, wherein the second storage buffer is configured to receive structured query language statements from a plurality of procedures and to store the received structured query language statements in a queue.

* * * * *